United States Patent [19]
Kokubo

[11] 3,777,073

[45] Dec. 4, 1973

[54] TAPE CASSETTE ADAPTER HAVING DRIVE MEANS WITHOUT A FLYWHEEL

[75] Inventor: Noriyoshi Kokubo, Yokohama, Japan

[73] Assignee: Victor Company of Japan, Ltd., Yokohama-City, Kanagawa-ken, Japan

[22] Filed: Mar. 30, 1972

[21] Appl. No.: 239,615

[30] Foreign Application Priority Data

| | | |
|---|---|---|
| Apr. 7, 1971 | Japan | 46/25987 |
| May 12, 1971 | Japan | 46/38046 |
| May 19, 1971 | Japan | 46/40489 |
| June 2, 1971 | Japan | 46/45965 |
| July 6, 1971 | Japan | 46/59214 |
| July 6, 1971 | Japan | 46/59215 |
| July 26, 1971 | Japan | 46/66186 |

[52] U.S. Cl. .......... 179/100.2 Z
[51] Int. Cl. .......... G11b 31/00
[58] Field of Search .......... 179/100.2 Z, 100.11; 226/168

[56] References Cited

UNITED STATES PATENTS

| | | | |
|---|---|---|---|
| 3,531,127 | 9/1970 | Harper | 179/100.2 Z |
| 3,644,684 | 2/1972 | Tsuji | 179/100.2 Z |
| 3,516,616 | 6/1970 | Adell | 226/168 |
| 3,289,906 | 12/1966 | Schuller | 226/168 |
| 3,559,861 | 2/1971 | Knox | 226/168 |

*Primary Examiner*—Vincent P. Canney
*Assistant Examiner*—Robert S. Tupper
*Attorney*—Holman and Stern

[57] ABSTRACT

A cassette adapter comprises, essentially, a cartridge-shaped casing for containing a tape cassette, a tape driving pinch roller driven by rotating force transmitted thereto from a rotating capstan on the side of the tape driving device of the cartridge playing apparatus, and a fixed pin or stud for projecting into the cassette thus contained. The fixed pin thus inserted takes a position on the inner side of the tape installed in the cassette. The driving pinch roller, which is made thinner than the width of the tape and rotates positively, presses against the fixed pin only over the tape interposed therebetween and thus drives the tape by friction between it and the tape.

6 Claims, 10 Drawing Figures

TAPE CASSETTE ADAPTER HAVING DRIVE MEANS WITHOUT A FLYWHEEL

BACKGROUND OF THE INVENTION

The present invention relates to a tape cassette adapter, and more particularly to a new and advanced cassette adapter which accommodates a tape cassette therein and operates the same in cooperation with a tape driving device for a tape cartridge.

In general, a tape cartridge such as that of the Lear Jet type, for example, contains therein a tape and a built-in pinch roller. When the cartridge is inserted into the loaded position in a cartridge operating device, the pinch roller presses the tape against a capstan provided in the operating device and causes the tape within the cartridge to be driven and thereby to travel. On the other hand, a tape cassette of the Phillips type commonly called as a compact cassette contains only a tape therein. When this cassette is inserted into the loaded position in a cassette operating device, a capstan on the side of the operating device passes through an opening in the cassette casing and fits into the inner side of the tape. In the operation of the cassette operating device, a pinch roller on the device side presses the tape against this capstan to cause the tape to be driven and travel.

For this reason, the tape in a tape cassette cannot be driven and operated by inserting the cassette as it is, directly into cartridge operating device. The terms "operating" and "operated" as used herein with respect to cassettes and cartridges collectively designate the operations of reproduction only and recording and reproduction.

Accordingly, devices known as cassette adapters or cassette packs, each constructed with the same exterior shape as a tape cartridge and adapted to contain a tape cassette therein, are being used. When a cassette adapter is inserted into the loaded state into a cartridge operating device, the rotating force from the capstan of the operating device is transmitted to drive the tape within the cassette contained within the adapter.

In a cassette adapter of this character known heretofore, the mechanism within the cassette for driving the tape has comprised a first pinch roller provided within the adapter and rotated by being pressed against the capstan in the operating device, a second pinch roller receiving rotation transmitted from the first pinch roller, a capstan which rotates by being pressed by the rotating second pinch roller, and a flywheel for stabilizing the rotation of this capstan. The tape within the cassette is pinched between the second pinch roller and the capstan of the adapter and thereby driven.

However, in each of these adapters of this character known heretofore, a rotating capstan has been used, and for this reason it has been necessary to provide a flywheel for stabilizing the rotation of this capstan and thereby to prevent generation of wow and flutter. As a result, the thickness dimension and the weight of the cassette adapter have tended to be large. Another disadvantageous result is that the arrangement of other component parts has been subject to restriction because of the lack of space due to the flywheel.

SUMMARY OF THE INVENTION

Accordingly, a general object of the present invention is to provede a new and useful cassette adapter in which the above described disadvantages accompanying known adapters have been removed.

Another object of the invention is to provide a cassette adapter having a tape driving mechanism capable of effectively and stably driving the tape without the use of a rotating capstan. In the cassette adapter according to the present invention, a driving pinch roller presses against a fixed pin over the tape interposed therebetween, whereby the tape is driven in longitudinal travel by friction between the surface of the driving pinch roller which is rotating positively and the surface of the tape. Since there is no rotating capstan, a flywheel or similar device is not necessary. Accordingly, the resulting drive mechanism in the adapter is simple, and the adapter can be made thin and light. Furthermore, the other component parts are not subject to restrictions in arrangement for reasons of space. Moreover, the adapter can be produced at low cost.

Still another object of the invention is to provide a cassette adapter having a tape driving mechanism capable of driving the tape stably and smoothly without wow and flutter. The fixed pin, against which the driving pinch roller presses over the tape, has a planer part, whereby the driving pinch roller can rotate with almost no deformation thereof, and no wow and flutter is produced.

Further objects and features of the present invention will be apparent from the following detailed description with respect to preferred embodiments of the invention when read in conjunction with the accompanying drawings, in which like parts are designated by like reference numerals.

DETAILED DESCRIPTION

Figure 1:
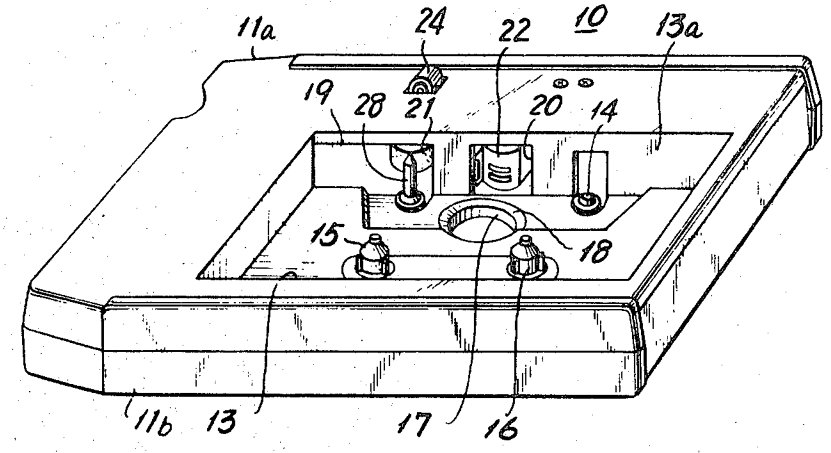
FIG. 1 is a perspective view of one embodiment of a cassette adapter according to the invention in the state prior to accommodating therein of a tape cassette.
Figure 2:
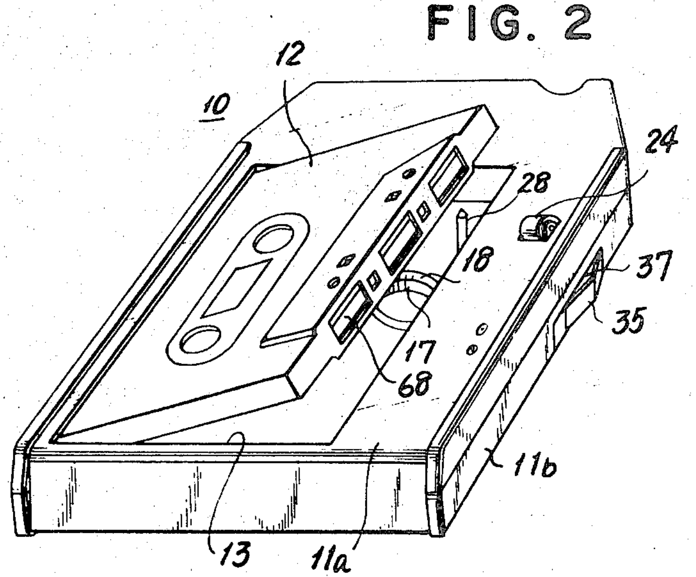
FIG. 2 is a perspective view of the cassette adapter shown in FIG. 1 in a state wherein a cassette is shown in an intermediate position during its accommodation into the adapter.

One embodiment of a cassette adapter according to the invention is illustrated in FIGS. 1 and 2, which respectively indicate the state thereof prior to insertion thereinto of a cassette and a state wherein a cassette is shown in an intermediate position during its accommodation in the adapter.

The casing of the cassette adapter generally designated by the reference numeral 10 is made up of an upper half 11*a* and a lower half 11*b* and has the same exterior shape and dimensions as an ordinary standard cartridge of the Lear Jet type. The upper half 11*a* of the casing is provided with a recessed part 13 for accommodating an ordinary tape cassette 12 of oblong shape, the longer sides of this recessed part 13 being parallel to the longer sides of the adapter casing 11.

The bottom of the recessed part 13 is provided at appropriate positions with openings through which a fixed stud or pin 28, a cassette positioning stud 14, a tape takeup reel shaft 15, and a tape supply reel shaft 16, which are provided in the lower half 11*b* of the casing as described hereinafter, project upward. The bottom of the recessed part 13 is further provided with a through hole 18 coaxially alined with a through hole 17 provided in the lower half 11*b* of the casing. These holes 17 and 18 afford access for a finger tip inserted therethrough from below, when a cassette 12 accommodated in the recessed part 13 is to be easily removed, to push upward against the bottom of the cassette thereby to facilitate the extraction thereof. A side wall 13*a* of the recessed part 13 is provided with window openings 19 and 20 respectively for a driving pinch roller 21 and a magnetic head 22 installed in the casing lower half 11*b* as described hereinafter and confronting these window openings. When the cassette adapter 10 is in its state prior to insertion into a cartridge operating device, the driving pinch roller 21 and the magnetic head 22 are in respective positions retracted from the window openings 19 and 20 so as not to obstruct the loading of a cassette 12 into the recessed part 13.

Figure 10:
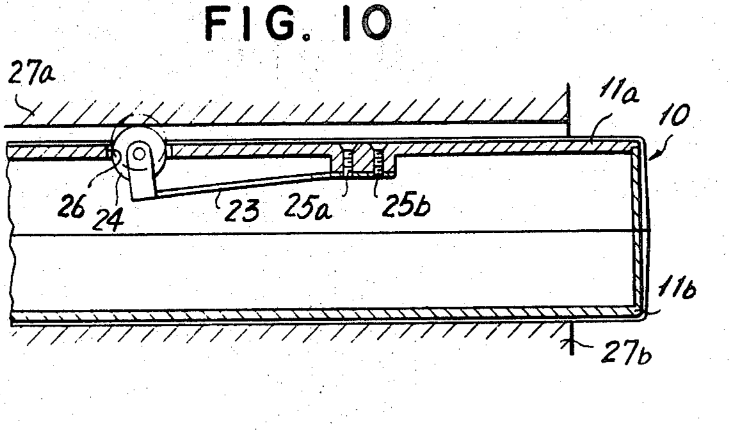
FIG. 10 is partial sectional view of a roller and related parts provided at the upper part of the adapter casing.

The upper panel of the casing upper half 11*a* is provided with an opening 26 for projection upward therethrough of a roller 24 rotatably supported on the distal extremity of a leaf spring 23 as shown also in FIG. 10. The other end of the spring 23 is fixed by screws 25*a* and 25*b* to the lower surface of the upper panel of the casing upper half 11*a*. The roller 24 is thereby urged continually upward by the leaf spring 23 to project outward through the opening 26. When the cassette adapter 10 is inserted into the loading part of a cartridge driving device for receiving a cartridge or a cassette adapter as described hereinafter, the roller 24 contacts the lower surface of the upper wall 27*a* of the loading part and is thereby depressed slightly into the casing upper half 11*a*, counter to the force of the leaf spring 23. After the cassette adapter 10 is thus inserted into loading position, the roller 24 is urged by the force of the spring 23 to press upward against the lower surface of the upper wall 27*a* of the loading part, whereby the cassette adapter 10 is held in place by the upper and lower walls 27*a* and 27*b* of the loading part of the driving device through the function of the leaf spring 23 and the roller 24. In general, the vertical dimension of the cavity of the loading part is made greater than the thickness of the cassette adapter 10, but the cassette adapter is held positively and firmly in loaded position without vertical play because of above described parts and construction thereof. During insertion and extraction of the cassette adapter 10 into and out of the above mentioned loading part, the roller 24 rolls in contact with the lower surface of the upper wall thereof and thereby greatly reduces the resistance to the insertion and extraction of the adapter.

Figure 3:
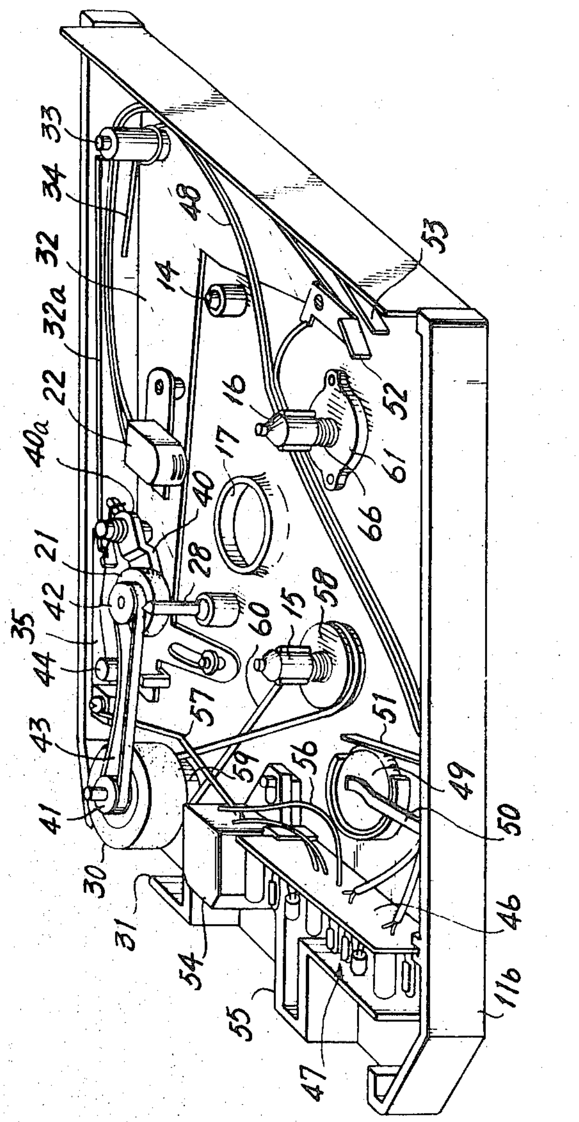
FIG. 3 is a perspective view showing the cassette adapter shown in FIG. 1 with the upper half part of its casing removed to show the essential internal mechanisms.
Figure 4:
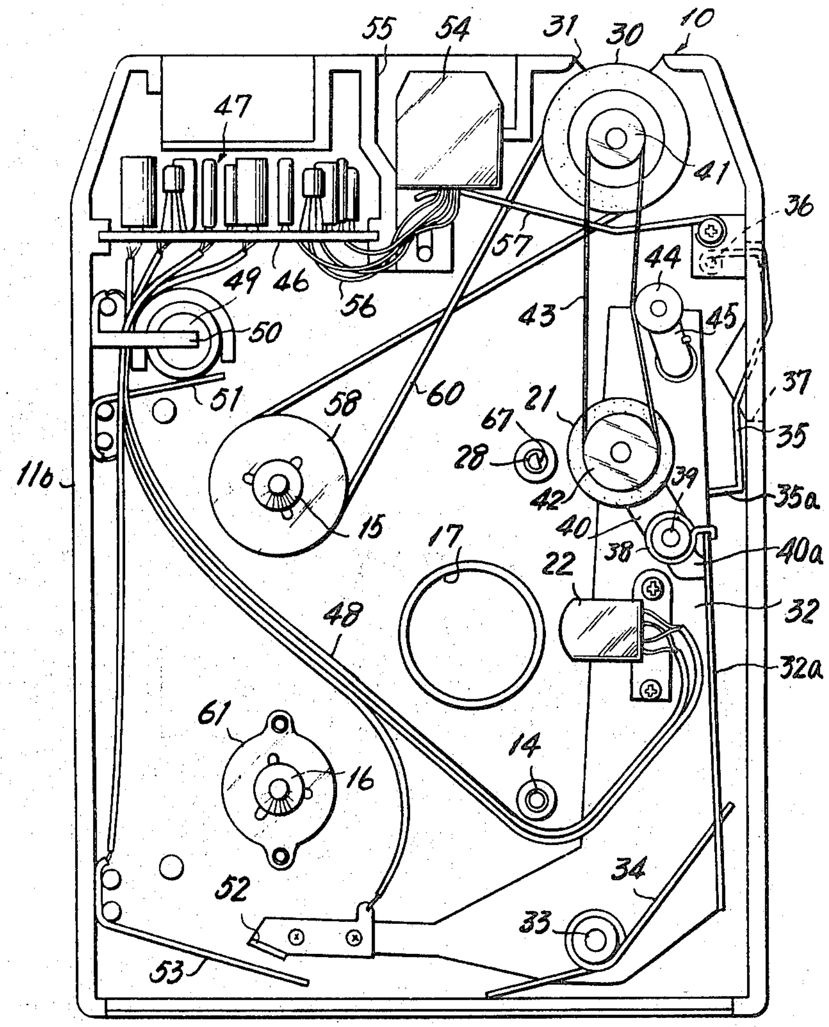
FIG. 4 is a partial plan view indicating the state of the mechanisms shown in FIG. 3 prior to insertion of the adapter into a cartridge operating device.
Figure 5:
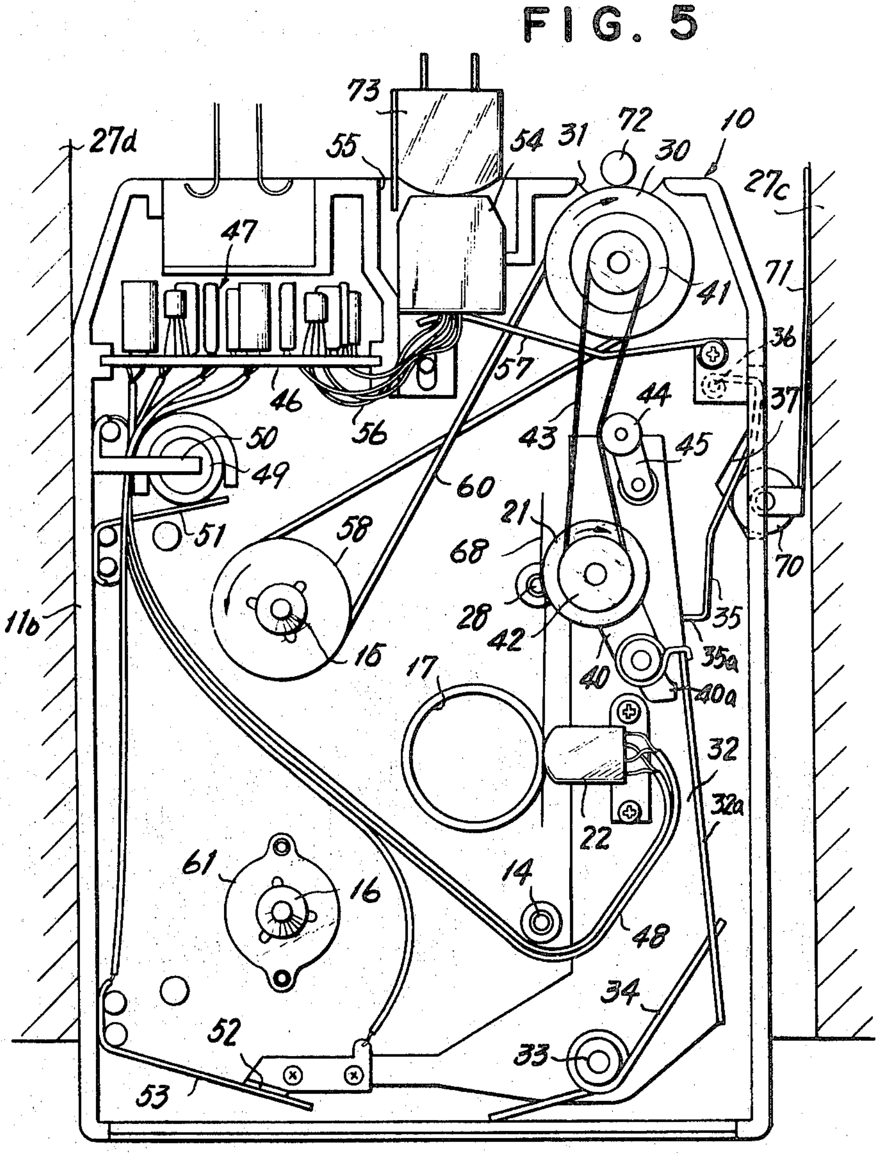
FIG. 5 is a plan view indicating the state of the mechanisms shown in FIG. 3 after insertion of the adapter into a cartridge operating device.

The casing lower half 11*b* houses therein mechanisms as shown in FIGS. 3, 4 and 5 and described below. The leading or front end (left end as viewed in FIGS. 1 and 3) of the casing lower half 11*b* has an opening or a cutout 31. A pinch roller 30 is rotatably supported within the lower half 11*b* in a position to confront the cutout 31. An L-shaped lever 32 is pivoted at its bent part on a vertical pivot pin 33 and is continually urged by a spring 34 in the clockwise direction as viewed from above. A pushing lever 35 is pivoted at one end on a vertical pivot pin 36 and has a distal end 35*a* abutting against the outer side of the lever 32. The lever 35 is thereby urged to rotate in the counterclockwise direction by the lever 32 urged to rotated in the clockwise direction by the spring 34, but a part of the lever 35 is in contact with and stopped by the inner surface of the side wall of the casing lower half 11*b*, and these parts are thereby in the state indicated in FIG. 4. At this time, another part of the lever 35 is projecting slightly outward through a notch or an opening 37 in the side wall of the casing lower half 11*b* as shown in FIG. 2.

The peripheral surface of the driving pinch roller 21 is made of a substance of high frictional coefficient and is formed with a high degree of roundness approaching a true circular cylinder. The driving pinch roller 21 is rotatably supported on the distal extremity of a lever 40 which is pivotally supported at its proximal end on a vertical pivot pin 39 fixedly supported on the lever 32 and urged to rotate in the counterclockwise direction, as viewed from above, by a spring 38. The lever 40 is normally in the state indicated in FIG. 4 with another arm end part 40*a* thereof in engagement with a bent-up flange part 32*a* of the above mentioned lever 32. The driving pinch roller 21 at this time is in a position spaced apart from the fixed pin 28 embeddedly fixed at its root part in the bottom of the casing lower half 11*b*. The detailed description of the fixed pin 28 will be made hereinafter.

A pulley part 41 is fixed coaxially to and above the pinch roller 30, while another pulley part 42 is fixed coaxially to and above the driving pinch roller 21. An endless belt 43 is stretched around these pulley parts 41 and 42 and is tensioned by a pin 44 provided on the distal end of a lever 45 and pressed transversely against one span of the endless belt 43. The lever 45 is pivoted at its proximal end on the lever 32 and is urged to rotate in the counterclockwise direction as viewed from above, being normally held in the position indicated in FIG. 4. The endless belt 43 is made of a material such as Mylar, a fabric, or a leather which is resistant to stretching and contracting. When the lever 32 is in the position indicated in FIG. 4, the belt 43 is slightly slack, while the belt 43 is tight when the lever 32 is in the position indicated in FIG. 5. Since a material which does not stretch or contract is selected for the belt 43, it transmits rotation from the pinch roller 21 without rotational deviations or irregularities in the rotation of the driving pinch roller 21.

The aforementioned reproducing magnetic head 22 is fixedly mounted on the lever 32 and is electrically connected by conductor wires 48 to an amplification circuit 47 provided on a base plate 46. The amplification circuit 47 is supplied with electric power from a mercury storage cell 49, which is pressed by terminals 50 and 51 in the form of leaf springs and thus held in place. An electrical contact 52 is mounted on the extreme end of the other arm of the lever 32 remote from the driving pinch roller 21 and, together with a stationary contact 53 fixed to a part of the casing lower half 11*b*, constitutes a switch. When the lever 32 rotates as described hereinafter, the contact 52 contacts the stationary contact 53 to connect electrically the mercury storage cell 49 to the amplification circuit 47. A magnet head 54 for coupling is mounted with a slight degree of freedom in sliding on the casing lower half 11*b* in a position to confront an opening 55 in the front end of the casing lower half. This magnetic head, which is electrically connected by conductor wires 56 to the amplification circuit 47, is urged forward by the force of a wire spring 57 and is normally stopped in the position indicated in FIGS. 3 and 4.

Figure 9:
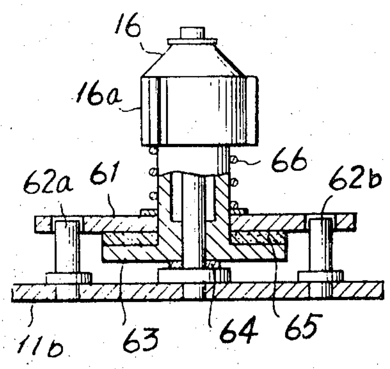
FIG. 9 is an elevational view, in vertical section, showing the disc for the tape supply reel in the adapter of the invention.

A tape take-up reel disc 58 having the vertical reel shaft 15 in the center thereof is coupled to the aforementioned pinch roller 30 by an endless belt 60 made of rubber and stretched in a crossed state around the reel disc 58 and a pulley part 59 fixed coaxially to and below the pinch roller 30. The tape supply reel disc 61 having the vertical reel shaft 16 in the center thereof is fixed and prevented from rotating by stud pins 62*a* and 62*b* embedded at their lower ends in the bottom of the casing lower half 11*b* as shown in FIG. 9. A flange 63 is formed at the lower end of the reel shaft 16, which bears rotatably on a washer 64 disposed coaxially therebelow. An annular piece of felt 65 is interposed as a friction member between the lower surface of the reel disc 61 and the upper surface of the flange 63. Between the head part 16*a* of the reel shaft 16 and the reel disc 61, there is interposed a coil compression spring 66, which elastically exerts an upward force on the reel shaft 16 and the flange 63 and a downward force on the reel disc 61. Consequently, the upper surface of the frange 63 is forced upward to press the felt 63 against the lower surface of the reel disc 61. Accordingly, when the reel shaft 16 is rotated by the traveling movement of the driven tape as described hereinafter, the reel shaft 16 is subjected to the frictional force between the flange 63, the felt 65, and the reel disc 61. For this reason, a suitable back tension is applied to the tape supplied from the supply reel mounted on the reel shaft 16. Since the mechanism for imparting the back tension on the tape can be realized with an extremely simple construction of parts as described above, the vertical height thereof can be made very small. This feature is conveniently advantageous in fulfilling the requirement for preventing enlargement of the thickness of cassette adapters.

Figure 6:
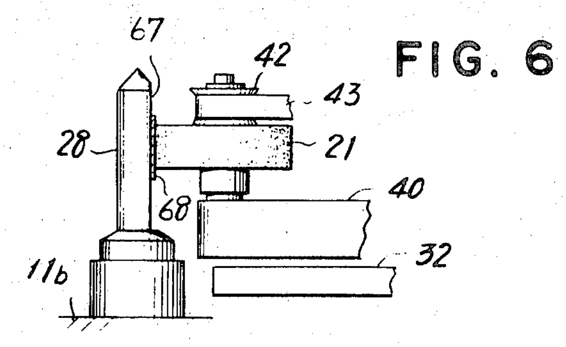
FIG. 6 is an elevational view showing a fixed pin and a driving pinch roller holding a tape therebetween and constituting a tape driving mechanism in the adapter.

The above mentioned fixed pin 28 is fixedly mounted at its lower root end in the bottom of the casing lower half 11*b* in the same position as that of a capstan in a conventional cassette adapter. While this fixed pin 28 may have the shape of a column of circular cylindrical form, this fixed pin in the instant embodiment has a planar part 67 where the driving pinch roller 21 presses thereagainst as indicated in FIGS. 4, 5 and 6, particularly well in FIG. 6. Furthermore, the driving pinch roller 21 is made with a thickness less than the width of the magnetic tape 68 within the cassette 12 as indicated in FIG. 6.

The cassette adapter 10 of the above described construction according to the invention operates as follows. First, a cassette 12 is inserted into the loading position in the recessed part 13 of the adapter 10. At this time, the fixed pin 28 passes through an opening in the casing lower part 11*b* of the cassette 12 and, with its planar part 67 facing the magnetic tape 68, fits into the inner side thereof. The reel shafts 15 and 16 respectively engage with shaft holes provided at reels to which the two ends of the magnetic tape 68 are respectively fixed in the cassette 12. With the above mentioned parts in the state described, the cassette adapter 10 is inserted into the loading part of a cartridge operating device. At this time, the cassette adapter 10 is held positively with respect to movement in the vertical direction against the upper and lower walls 27*a* and 27*b* of the loading part by the roller 24 as described hereinbefore in conjunction with FIG. 10.

On one hand, as shown in FIG. 5, a leaf spring 71 rotatably supporting at its free end a roller 70 is fixed at its proximal end to the right-hand wall 27*c* of the above mentioned loading part. When the cassette adapter 10 is inserted to the predetermined position into the loading part, the notch roller 70, pressing against the lever 35, fits into the opening 37 provided in the casing lower half 11*b*. Consequently, the left side surface of the cassette adapter 10 is pressed against the left wall 27*d* of the loading part, whereby the adapter is held positively in the predetermined inserted and loaded position by the left wall 27*d* and the roller 70 without play in the left and right direction. Furthermore, when the cassette adapter 10 is in this state where it has been inserted to the required position as described above, the pinch roller 30 is pressing against a capstan 72 driven in rotation by a motor (not shown) provided on the driving device side. The aforementioned magnetic head 54 for coupling is in contact with a magnetic head 73 on the driving device side, and these two magnetic heads 54 and 73 are electro-magnetically coupled.

When the roller 70 fits into the opening 37 in the casing lower half 11*b* as described above, it pushes the lever 35 to rotate it in the clockwise direction and thereby to push the lever 32, which is thereby rotated in the counterclockwise direction counter to the force of the spring 34 and thus arrives at the position indicated in FIG. 5. When the lever 32 is in this state, the roller 44 presses against the outer surface of the belt 43 thereby to place the belt in a state wherein it is stretched between the pulleys 41 and 42 with a specific tension. Accordingly, the rotation of the pinch roller 30 pressed against the rotating capstan 72 is transmitted by way of the belt 43 without slippage to the driving pinch roller 21. Furthermore, since the belt 43 is fabricated from a material which does not shrink or contract as mentioned hereinbefore, the driving pinch roller 21 is rotated in an excellent manner without giving rise to wow and flutter.

Furthermore, the above described rotation of the lever 32 causes the driving pinch roller 21 to press against the planar surface part 67 of the fixed pin 28 over the magnetic tape 68 within the cassette 12 as indicated in FIGS. 5 and 6. It should be noted here that, as described hereinbefore, the thickness of the driving pinch roller 21 is made smaller than the width of the magnetic tape 68. For this reason, the entire outer peripheral surface of the driving pinch roller 21 presses against the magnetic tape 68 without directly contacting the fixed pin 28. As a result, the magnetic tape 68 is caused by the friction between it and the driving pinch roller 21 to accompany the rotation of the driving pinch roller ratating in a positive manner and is thereby driven and caused to travel. Since the magnetic tape 68 is driven only by the frictional force between it and the driving pinch roller 21, it is desirable that the frictional drag between the magnetic tape 68 and the fixed pin 28 be small, and accordingly the planar part 67 of the fixed pin 28 has a smooth finish. The magnetic tape 68, as it is driven and thereby caused to travel, rubs in sliding contact against the fixed pin 28, but since the surface of the tape which is in sliding contact with the fixed pin is opposite the magnetic surface, there is no possibility of the magnetic surface of the magnetic tape 68 being damaged or impaired.

In a tape driving mechanism of the conventionally known type wherein a pinch roller presses against a positively rotating capstan over a magnetic tape interposed therebetween, the thickness of the pinch roller is made greater than the width of the magnetic tape. For this reason, the pinch roller is pressed at its middle part by the magnetic tape and at its upper and lower parts by the capstan. Since the frictional force between the pinch roller and the magnetic tape is greater than the frictional force between the capstan and the magnetic tape, the pinch roller is rotated by the positive driving rotation of the capstan, whereby the magnetic tape is driven. For this reason, a so-called creeping effect is produced between the part where the pinch roller presses directly against the capstan and the part where it presses against the capstan over the tape, and, depending on the magnitudes of the tape thickness, hardness of the pinch roller, and the contacting force, the driving force varies. As a result, there arises the problem of fluctuations in the running speed of the tape.

With respect to this problem, the present invention provides a tape driving mechanism wherein a fixed pin 28 is fixed without rotating at a position corresponding to that of the capstan in known mechanisms, and a driving pinch roller 21 corresponding to the conventional pinch roller is adapted to rotate positively by itself to drive the tape. Another feature of the invention is that the driving pinch roller 21 is fromed with a thickness such that it will not directly contact the fixed pin 67. For this reason, the above described creeping phenomenon does not occur between the magnetic tape 68 and the driving pinch roller 21, and the magnetic tape 68 is driven stably without speed fluctuation by only the friction force between it and the driving pinch roller 21. In addition, since the fixed pin 28 does not rotate, there is no possibility of wow and flutter, and other defects which accompany the rotation of the pin (or capstan).

While the fixed pin 28 may be in the form of a column of circular cross section, the driving pinch roller 21 in this case is deformed at its part pressed against the fixed pin 28. However, when the fixed pin 28 is provided with a planar part 67 as in the instant embodiment, the driving pinch roller 21 undergoes almost no deformation, whereby stable driving of the tape without wow and flutter can be accomplished.

The reel disc 58 is rotated by rotating force transmitted from the pinch roller 30 by way of the endless belt 60. The take-up reel installed within the cassette 12 and engaged with the reel shaft 15 is thereby rotated to take up the magnetic tape 68 driven and sent by the driving pinch roller 21. As the magnetic tape 68 is thus driven and travels, the tape supply reel shaft 16 is subjected to a suitable frictional force due to the felt 65, as described hereinbefore in conjunction with FIG. 9. Accordingly, the magnetic tape 68 unwound from the supply reel engaged with the reel shaft 16 is subjected to a suitable back tension.

The magnetic head 22 contacts the magnetic tape 68 and reproduces signals previously recorded thereon. At the same time, the moving contact 52 contacts the stationary contact 53, whereby the mercury storage cell 49 is electrically connected to the amplification circuit 47. Consequently, a signal reproduced by the magnetic head 22 is amplified in the amplification circuit 47 and then supplied to the magnetic head 54 for coupling. This signal is electromagnetically transmitted from the magnetic head 54 to the magnetic head 73 of the driving device and, passing through an electrical circuit connected to the magnetic head 73, is reproduced through a speaker (not shown).

Upon completion of the reproduction or playing of the recorded signals, the cassette adapter 10 is pulled out of the loading part of the cartridge operating device. The pinch roller 30 is thereby separated from the capstan 72 and stops its rotating. Furthermore, the roller 70 also retracts outward from the opening 37, whereby the lever 35 is released from the pressing action of the roller 70. Consequently, the lever 32 is rotated in the clockwise direction by the spring 34, and the driving pinch roller 21 separates away from the fixed pin 28 and the magnetic tape 68. The magnetic head 22 also separates from the magnetic tape 68, and the belt 43 is released from the tensioning applied by the pin 44. The moving contact 52 separates from the contact 53, and the entire device returns to the state indicated in FIG. 4.

Figure 7:
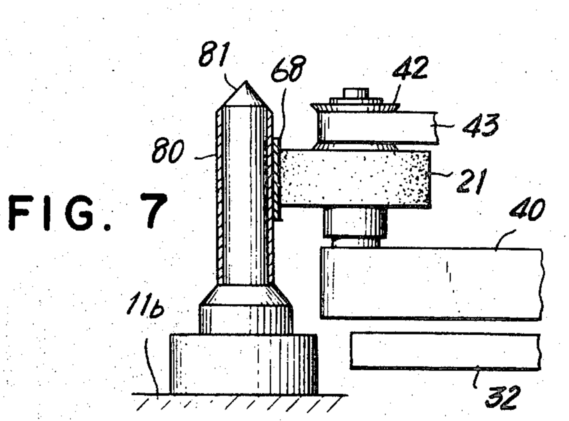
FIGS. 7 and 8 are elevational views respectively showing other embodiments of the fixed pin in the adapter according to the invention.
Figure 8:
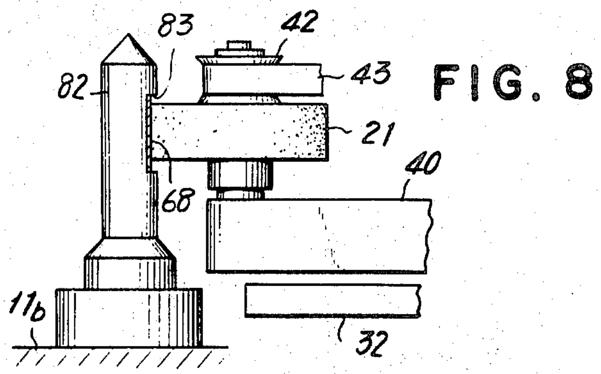

Next, the invention will now be described with respect to further embodiments of the fixed pin 28 with reference to and as illustrated by FIGS. 7 and 8, respectively.

In the embodiment shown in FIG. 7, a sleeve 80 is closely fitted on and around a fixed pin 81 of the shape of a column of circular cross section. This sleeve 80 is made of a material, such as Teflon (trade name), of low coefficient of friction, whereby the magnetic tape 68 is driven in smooth sliding contact with the sleeve 80 with extremely low frictional drag. As a modification of this embodiment, the fixed pin 81 may be made in the form of the fixed pin 28 having a planar part as in the preceding embodiment, and the sleeve 80 may be formed to closely fit on and around this fixed pin.

In the other embodiment as illustrated in FIG. 8, a fixed pin 82 of the shape of a column with a circular cross section is provided with a cutout slot 83. This slot 83 has a width, in the vertical direction, which is substantially the same as or slightly greater than the width of the magnetic tape 68, and the surface against which the tape 68 contacts is made planar. In the slot 83, the magnetic tape is driven by the driving pinch roller 21 and, at the same time, is vertically positioned and guided by the upper and lower ends of this slot 83.

Further, this invention is not limited to these embodiments but various variations and modifications may be made without departing from the scope and spirit of the invention.

I claim:

1. A tape cassette adapter cooperating with a tape cartridge player and comprising:

a casing having a recessed part for accommodating therein a tape cassette and having an exterior shape and dimensions similar to those of a standard tape cartridge;

a first pinch roller means having no flywheel and disposed in said casing so as to press against a rotating capstan means mounted in the tape cartridge player when said casing is inserted into a predetermined loading position within the tape cartridge player, so that said first pinch roller means is rotated by the capstan;

a fixed pin means fixedly connected to said casing and projecting into said recessed part so as to cooperatively fit into said tape cassette and be positioned on the inner side of a tape installed therein when the tape cassette is accommodated in said recessed part, said fixed pin means having a smooth planar part which opposes a surface of the tape;

a second pinch roller means having no flywheel and frictionally associated with the smooth planar part of said fixed pin and having the tape interposed therebetween so that the tape is driven by frictional force between the tape and said second pinch roller means;

an endless belt of a non-stretching and non-contracting nature stretched between said first and second pinch roller means;

a magnetic head for recording a signal on the tape and for reproducing a signal from the tape;

coupling means for transferring the signal between said magnetic head and the tape cartridge player; and a means for causing said second pinch roller means and said magnetic head to contact the tape and separate therefrom.

2. The tape cassette adapter as defined in 1 wherein the thickness of said second pinch roller means in the axial direction thereof is less than the width of said tape, whereby said second pinch roller means presses against said fixed pin means only over the tape without directly contacting said pin fixed means.

3. The tape cassette adapter as defined in claim 1 further comprising a sleeve of a material of low coefficient of friction closely fitted on and around the outer peripheral surface of said fixed pin means.

4. The tape cassette adapter as defined in claim 1 wherein the smooth planar part of said fixed pin means has a cutout slot the width of which is formed in the axial direction of said fixed pin means, said width being no less than the width of the tape.

5. The tape cassette adapter as defined in claim 1 wherein said means for causing said second pinch roller means and the magnetic head to contact the tape and separate therefrom comprises a pivoted lever rotatably supporting said second pinch roller means and fixedly supporting said magnetic head, means for imparting to said pivoted lever a torque such as to cause said second pinch roller means and said magnetic head to separate from said tape, and rotating means for rotating said pivoted lever in a manner so as to cause said second pinch roller means and said magnetic head to contact said tape, said rotating means being actuated from the side of said casing by a pressing member for casing retention provided in said tape cartridge player when the casing is inserted into the predetermined loading position within the tape cartridge player.

6. The tape cassette adapter as defined in claim 5 further comprising an amplifier circuit for amplifying signals reproduced by said magnetic head; and wherein said coupling means includes a coupling magnetic head caused to contact with a second magnetic head disposed in said tape cartridge player when the casing is inserted into the predetermined loading position, said coupling magnetic head transmitting to said second magnetic head the output signals of said amplifier circuit; an electric power source for operating said amplifier circuit; and switch means responsive to the pivotal rotation of said pivoted lever for opening and closing an electrical connection between said electric power source and said amplifier circuit, said switch means being adapted to close said electrical connection when said pivoted lever pivotally rotates in a manner to cause said second pinch roller means and said magnetic head to contact said tape.

* * * * *